US008818043B2

(12) United States Patent
Fairfield et al.

(10) Patent No.: US 8,818,043 B2
(45) Date of Patent: *Aug. 26, 2014

(54) TRAFFIC SIGNAL MAPPING AND DETECTION

(71) Applicant: Google Inc., Mountain View, CA (US)

(72) Inventors: Nathaniel Fairfield, Mountain View, CA (US); Christopher Paul Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,124

(22) Filed: Mar. 10, 2014

(65) Prior Publication Data
US 2014/0185880 A1 Jul. 3, 2014

Related U.S. Application Data

(63) Continuation of application No. 14/030,397, filed on Sep. 18, 2013, now Pat. No. 8,712,104, which is a continuation of application No. 12/819,575, filed on Jun. 21, 2010, now Pat. No. 8,559,673.

(60) Provisional application No. 61/297,468, filed on Jan. 22, 2010.

(51) Int. Cl.
*G06K 9/00* (2006.01)
(52) U.S. Cl.
CPC .................................. *G06K 9/00825* (2013.01)
USPC ...................................... 382/104; 342/357.25

(58) Field of Classification Search
USPC .......................................................... 382/104
See application file for complete search history.

(56) References Cited

U.S. PATENT DOCUMENTS

| 4,814,765 | A | 3/1989 | DeRoche et al. |
| 5,633,629 | A | 5/1997 | Hochstein |
| 6,628,804 | B1 | 9/2003 | Edanami |
| 2002/0080998 | A1 | 6/2002 | Matsukawa et al. |
| 2005/0187701 | A1 | 8/2005 | Baney |
| 2007/0046500 | A1 | 3/2007 | Herbert et al. |
| 2007/0047809 | A1* | 3/2007 | Sasaki ............................ 382/170 |
| 2008/0170754 | A1 | 7/2008 | Kawasaki |
| 2008/0253615 | A1 | 10/2008 | Kubota et al. |
| 2009/0303077 | A1* | 12/2009 | Onome et al. ................. 340/901 |

FOREIGN PATENT DOCUMENTS

| EP | 1220182 A2 | 7/2002 |
| EP | 2034271 A1 | 3/2009 |
| WO | 2007102065 A1 | 9/2007 |

OTHER PUBLICATIONS

International Search Report and Written Opinion for Application No. PCT/US2011/021797 dated Jun. 1, 2011.

* cited by examiner

*Primary Examiner* — Amara Abdi
(74) *Attorney, Agent, or Firm* — Lerner, David, Littenberg, Krumholz & Mentlik, LLP

(57) ABSTRACT

A system and method provides maps identifying the 3D location of traffic lights. The position, location, and orientation of a traffic light may be automatically extrapolated from two or more images. The maps may then be used to assist robotic vehicles or human drivers to identify the location and status of a traffic signal.

20 Claims, 8 Drawing Sheets

TRAFFIC SIGNAL MAPPING AND DETECTION

CROSS-REFERENCE TO RELATED APPLICATION

The present application is a continuation of U.S. patent application Ser. No. 14/030,397, filed on Sep. 18, 2013, which is a continuation of U.S. patent application Ser. No. 12/819,575, filed on Jun. 21, 2010, which claims the benefit of the filing date of U.S. Provisional Application No. 61/297,468, filed Jan. 22, 2010, the disclosures of which are hereby incorporated by reference.

BACKGROUND OF THE INVENTION

1. Field of the Invention

The invention relates generally to building maps of traffic signals. More specifically, these maps may be used to perform real time traffic signal detection.

2. Description of Related Art

A key component of a robot vehicle is the perception system, which allows the vehicle to perceive and interpret its surroundings while driving. Humans have engineered the driving problem to make it easier. For example, lanes are delineated by lines painted on the road, traffic lights for precedence at intersections, brake lights, and turn signals, are all intended to simplify the perception task. Robots can use these driving aids, but in many cases they are able to use alternative sensing modalities, such as radar or lidar, instead of vision. In addition to these other sensing modalities, robots can often leverage prior maps to simplify online perception. Using a prior map that includes stop signs, speed limits, lanes, etc., a robot vehicle can largely simplify its onboard perception requirements to the problem of estimating its position with respect to the map (localization), and dealing with dynamic obstacles, such as other vehicles (perception).

Traffic signals are a major challenge for robot vehicles. Efforts have been made to broadcast traffic light state over radio, but this requires a significant investment in infrastructure. While robots can often employ active sensors such as radar and lidar to perceive their surroundings, the state of traffic signals can only be perceived visually. Although any vision task may be challenging due to the variety of outdoor conditions, traffic lights have been engineered to be highly visible.

BRIEF SUMMARY OF THE INVENTION

The invention relates generally to building maps of traffic lights. More specifically, these maps may be used to perform real time detection of the status of traffic signals.

One aspect of the invention provides a method of determining three-dimensional locations of traffic signals. The method includes receiving a plurality of images, each image of the plurality of images is associated with geographic location and orientation information; selecting, by a computer, one or more images of the plurality of images which are associated with the geographic locations proximate to traffic intersections; for each selected image, identifying by the computer red, yellow, and green objects within the selected image; identifying associated ones of the red, yellow, and green objects within two or more of the selected images, based on the geographic location and orientation information of the two or more selected images; determining the three-dimensional locations of traffic signals based on (1) the identified associations between the two or more of the selected images and (2) the geographic location and orientation information of the two or more selected images; and storing the three-dimensional locations of the traffic signals in memory accessible by the computer.

As discussed herein, different features may be used in any combination in any embodiment. For example, the method includes generating a map including the three-dimensional locations of the traffic signals.

In another example, each of the plurality of images is collected by one or more cameras, and each camera is associated with a vehicle. In an alternative, each of the one or more cameras is mounted on the vehicle. In another alternative, the geographic location and orientation information associated with each image are generated based on the geographic location and orientation information of the camera as determined by a geographic position device.

In another example, the geographic location and orientation information associated with each image are determined by a laser positioning device.

In another example, the geographic location and orientation information associated with each image are determined by a GPS positioning device.

In another example, the geographic location and orientation information associated with each image are determined by an inertial positioning device.

In another example, the geographic location information is GPS latitude and longitude coordinates.

In another example, where each of the plurality of images is collected by one or more cameras, and each camera is associated with a vehicle, each of the one or more cameras is associated with gain and shutter speed which are set to avoid saturation of a traffic signal light.

In another example, where each of the plurality of images is collected by one or more cameras, and each camera is associated with a vehicle, each image of the plurality of images is uploaded from each of the one or more cameras to the computer via a network.

In another example, where each of the plurality of images is collected by one or more cameras, and each camera is associated with a vehicle, each of the one or more cameras is positioned to minimally obstruct the view of a driver of the vehicle.

In another example, the identified red, yellow, and green objects are the appropriate size and aspect ratios to correspond to traffic signals. In still a further example, the identifying associated ones of the red, yellow, and green objects of two or more selected images is based on an association distance between identified objects of the two or more selected images.

In another example, the identifying associated ones of the red, yellow, and green objects of two or more selected images is based on the physical dimensions of a traffic signal.

In another example, the identifying associated red, yellow, and green objects of two or more selected images is based on direct motion compensation between the selected images, wherein each selected image is taken by a camera mounted on a moving vehicle.

In another example, the method includes identifying the identified ones of red, yellow, and green objects within a selected image as an object other than a traffic signal light based on the direct motion compensation.

In another example, the method includes determining a lane associated with the particular traffic signal based on comparing the determined the three-dimensional location of the particular traffic signal to a map of lanes through an intersection.

In another example, where the method includes generating a map including the three-dimensional locations of the traffic signals, the method includes downloading the map to a second computer of a vehicle.

In another example, where the method includes generating a map including the three-dimensional locations of the traffic signals, the method includes downloading the map to a client device.

In another example, where the method includes generating a map including the three-dimensional locations of the traffic signals, the method includes receiving a geographic location from a client device and transmitting to the client device a portion of the map based on the received geographic location.

Another aspect of the invention provides a device for determining three-dimensional locations of traffic signals. The device includes a processor and memory. The processor is configured to receive a plurality of images, each image of the plurality of images is associated with geographic location and orientation information; select one or more images of the plurality of images which are associated with geographic locations proximate to traffic intersections; for each selected image, identify red, yellow, and green objects within the selected image; identify associated ones of the red, yellow, and green objects within two or more of the selected images, based on the geographic location and orientation information of the two or more selected images; determine the three-dimensional locations of traffic signals based on (1) the identified associations between the two or more of the selected images and (2) the geographic location and orientation information of the two or more selected images; and store the three-dimensional locations of traffic signals in memory accessible by the device.

As discussed herein, different features may be used in any combination in any embodiment. For example, the processor is configured to generate a map including the three-dimensional locations of traffic signals.

In another example, each of the plurality of images is collected by one or more cameras, each camera associated with a vehicle. In an alternative, each of the one or more cameras is mounted on the vehicle. In another alternative, the geographic location and orientation information associated with each image are generated based on the geographic location and orientation of the camera as determined by a geographic position device.

In another example, the geographic location and orientation information associated with each image are determined by a laser positioning device.

In another example, the geographic location and orientation information associated with each image are determined by a GPS positioning device.

In another example, the geographic location and orientation information associated with each image are determined by an inertial positioning device.

In another example, the geographic location information is GPS latitude and longitude coordinates.

In another example, where each of the plurality of images is collected by one or more cameras, each of the one or more cameras is associated with gain and shutter speed which are set to avoid saturation of a traffic signal light.

In another example, where each of the plurality of images is collected by one or more cameras, each image of the plurality of images is uploaded from each of the one or more cameras to the device via a network.

In another example, where each of the plurality of images is collected by one or more cameras, each of the one or more cameras is positioned to minimally obstruct the view of a driver of the vehicle.

In another example, the identified red, yellow, and green objects are the appropriate size and aspect ratios to correspond to traffic signals.

In another example, the identifying associated ones of the red, yellow, and green objects of two or more selected images is based on an association distance between identified objects of the two or more selected images.

In another example, the identifying associated ones of the red, yellow, and green objects of two or more selected images is based on the physical dimensions of a traffic signal.

In another example, the identifying associated red, yellow, and green objects of two or more selected images is based on direct motion compensation between the selected images, wherein each selected image is taken by a camera mounted on a moving vehicle.

In another example, the processor is further configured to identify the identified ones of red, yellow, and green objects within a selected image as an object other than a traffic signal light based on the direct motion compensation.

In another example, the processor is further configured to determine a lane associated with the particular traffic signal based on comparing the determined the three-dimensional location of the particular traffic signal to a map of lanes through an intersection.

In another example, the processor is further configured to download the map to a second device associated with a vehicle.

In another example, the processor is further configured to download the map to a client device.

In another example, where the processor is configured to generate a map including the three-dimensional locations of traffic signals, the processor is further configured to receive a geographic location from a client device and transmitting to the client device a portion of the map based on the received geographic location.

An additional aspect of the invention provides a method of determining the status of a traffic signal. The method includes repeatedly determining a current location of a client device; determining an estimated location of the boundaries of a traffic signal based on a comparison of the current location of the client device to a map of three-dimensional locations of traffic signals; collecting images of the estimated location; for each collected image, identifying by the client device red, yellow, and green objects within the boundaries of the estimated location of the traffic signal; and determining the status of the traffic signal based on the color of the identified object.

As discussed herein, different features may be used in any combination in any embodiment. For example, the images are collected by a camera of the client device.

In another example, the current location of the client device is determined by a laser based positioning device. In another example, the current location of the client device is determined by a laser positioning device.

In another example, the current location of the client device is determined by a GPS positioning device.

In another example, the current location of the client device is determined by an inertial positioning device.

In another example, where the images are collected by a camera of the client device, the camera is associated with gain and shutter speed which are set to avoid saturation of a traffic signal light.

In another example, where the images are collected by a camera of the client device, the method includes accessing the map of three-dimensional locations of traffic signals from memory of the client device.

In another example, the identified red, yellow, and green objects are the appropriate size and aspect ratios to correspond to traffic signals.

In another example, determining the status of the traffic signal is based on the location of the identified object within the boundaries of the estimated location.

In another example, the boundaries of the estimated location are associated with dimensions, and the dimensions are greater than the dimensions of the traffic signal.

In another example, the method includes determining a traffic lane associated with the client device based on comparing the current location of the client device to a map of traffic lanes through an intersection.

In one alternative, determining an estimated location of the boundaries of the traffic signal is based on the traffic lane associated with the client device.

In another example, the method includes comprising requesting the map of three-dimensional locations of traffic signals from a computer over a network, the request including the current location of the client device.

In another example, the method includes receiving the map of three-dimensional locations of traffic signals from a computer over a network.

In another example, the method includes determining whether the status of the traffic signal has changed from a default status. In one alternative, if there are no identified objects within the boundaries of the estimated location of the traffic signal, the method includes determining that the status of the traffic signal is the default status. In an additional alternative, the default status is a yellow light. In a further alternative, the default status is a red light.

In another example, the method includes transmitting the status of the traffic signal to a computer associated with a vehicle.

In another example, the method includes decelerating the vehicle if the status of the light is red or yellow. In another example, the method includes identifying the status of the traffic signal audibly.

In another example, the method includes providing driving instructions based on the status of the traffic signal.

In another example, the client device includes an electronic display and the method further comprising identifying the status of the traffic signal on the electronic display.

Another aspect of the invention provides a device for determining three-dimensional locations of traffic signals. The device includes a processor and memory, including a first part for storing secondary resource files. The processor is configured to repeatedly determine the current location of a client device; determine an estimated location of the boundaries of a traffic signal based on a comparison of the current location of the client device to a map of three-dimensional locations of traffic signals; collect images of the estimated location; for each collected image, identify by the client device red, yellow, and green objects within the boundaries of the estimated location of the traffic signal; and determine the status of the traffic signal based on the color of the identified object.

As discussed herein, different features may be used in any combination in any embodiment. For example, the device includes a camera for collecting the images of the estimated location.

In another example, the location of the client device is determined by a laser positioning device.

In another example, the device includes a laser based positioning device and wherein the current location of the client device is determined by a laser positioning device.

In another example, the device includes a GPS based positioning device and wherein the current location of the client device is determined by the GPS positioning device.

In another example, the device includes an inertial based positioning device and wherein the current location of the client device is determined by the inertial positioning device.

In another example, the camera is associated with gain and shutter speed which are set to avoid saturation of a traffic signal light.

In another example, the processor is configured to access the map of three-dimensional locations of traffic signals from the memory of the client device.

In another example, the identified red, yellow, and green objects are the appropriate size and aspect ratios to correspond to traffic signals.

In another example, the processor determines the status of the traffic signal based on the location of the identified object within the boundaries of the estimated location.

In another example, the boundaries of the estimated location are associated with dimensions, and the dimensions are greater than the dimensions of the traffic signal.

In another example, the processor is further configured to determine a traffic lane associated with the client device based on comparing the current location of the client device to a map of traffic lanes through an intersection.

In another example, the processor determines an estimated location of the boundaries of the traffic signal based on the traffic lane associated with the client device.

In another example, the processor is further configured to request the map of three-dimensional locations of traffic signals from a computer over a network, the request including the current location of the client device.

In another example, the processor determines an estimated location of the boundaries of the traffic signal the processor is further configured to receive the map of three-dimensional locations of traffic signals from a computer over a network.

In another example, the processor is further configured to determine whether the status of the traffic signal has changed from a default status. In an alternative, the processor is further configured to determine that the status of the traffic signal is the default status if there are no identified objects within the boundaries of the estimated location of the traffic signal. In one alternative, the default status is a yellow light. In another alternative, the default status is a red light.

In another example, the processor is further configured to transmit the status of the traffic signal to a computer associated with a vehicle.

In another example, the processor is further configured to decelerate the vehicle if the status of the light is red or yellow. In another example, the processor is further configured to identify the status of the traffic signal audibly.

In another example, the processor is further configured to provide driving instructions based on the status of the traffic signal.

In another example, the device is mounted to a vehicle.

In another example, the device is a portable device. In another example, the device includes an electronic display and the processor is further configured to identify the status of the traffic signal on the electronic display.

A further aspect of the invention provides a method of determining the status of a traffic signal. The method includes repeatedly determining a current location of a client device; determining an estimated location of the boundaries of a traffic signal based on a comparison of the current location of the client device to a map of three-dimensional locations of traffic signals; collecting images of the estimated location; for each collected image, identifying by the client device red, yellow, and green objects within the boundaries of the estimated location of the traffic signal; and determining the status of the traffic signal based on the color of the identified object.

As discussed herein, different features may be used in any combination in any embodiment. For example, the positioning device is a laser positioning device.

In another example, the positioning device is a GPS positioning device.

In another example, the positioning device is an inertial positioning device.

In another example, the method includes positioning the camera on the vehicle to face directly ahead of the vehicle.

In another example, the method includes positioning the camera to the right of the rear-view mirror.

In another example, the method includes positioning the camera to limit obstruction of a field of view of a driver.

In another example, the memory is local memory of the camera.

In another example, the geographic locations are defined as GPS latitude and longitude coordinates.

In another example, the method includes receiving the plurality of images and the associated geographic location and orientation information; selecting one or more images of the plurality of images which are associated with geographic locations proximate to traffic intersections; for each selected image, identifying red, yellow, and green objects within the selected image; identifying associated ones of the red, yellow, and green objects within two or more of the selected images, based on the geographic location and orientation information of the two or more selected images; determining the three-dimensional locations of traffic signals based on (1) the identified associations between the two or more of the selected images and (2) the geographic location and orientation information of the two or more selected images; and storing the three-dimensional locations of traffic signals in memory accessible by the computer. In an alternative, the method includes generating a map including the three-dimensional locations of traffic signals.

In another example, where the method includes identifying associated ones of the red, yellow, and green objects within two or more of the selected images the identified red, yellow, and green objects are the appropriate size and aspect ratios to correspond to traffic signals.

In another example, where the method includes identifying associated ones of the red, yellow, and green objects within two or more of the selected images, the identifying associated ones of the red, yellow, and green objects of two or more selected images is based on an association distance between identified objects of the two or more selected images.

In another example, where the method includes identifying associated ones of the red, yellow, and green objects within two or more of the selected images, the identifying associated ones of the red, yellow, and green objects of two or more selected images is based on the physical dimensions of a traffic signal.

In another example, where the method includes identifying associated ones of the red, yellow, and green objects within two or more of the selected images, the identifying associated red, yellow, and green objects of two or more selected images is based on direct motion compensation between the selected images.

In another example, where the method includes identifying red, yellow, and green objects within the selected image, the method includes identifying the identified ones of red, yellow, and green objects within a selected image as an object other than a traffic signal light based on the direct motion compensation.

In another example, where the method includes identifying red, yellow, and green objects within the selected image, the method includes determining a lane associated with the particular traffic signal based on comparing the determined the three-dimensional location of the particular traffic signal to a map of lanes through an intersection.

Yet another aspect of the invention provides a device for collecting images of traffic signals. The device includes a vehicle; a camera with gain and shutter speed set to avoid saturation of a traffic signal light, the camera being mounted to the vehicle; a positioning device; a processor coupled to the vehicle; and memory, including a first part for storing images. The processor is configured to receive images from the camera; identify a geographic position associated with each image of the received images; store the images, geographic positions, and associations in the memory; and transmit the images, geographic positions, and associations to a computer over a network.

As discussed herein, different features may be used in any combination in any embodiment. For example, the camera is positioned on the vehicle to face directly ahead of the vehicle. In another example, the camera is positioned to the right of the rear-view mirror. In another example, the camera is positioned to limit obstruction of a field of view of a driver. In another example, the memory is local memory of the camera.

Still another aspect of the invention provides a client device including a processor and a computer. The computer includes memory and a processor. The processor is configured to receive a plurality of images, each image of the plurality of images is associated with geographic location and orientation information; select one or more images of the plurality of images which are associated with geographic locations proximate to traffic intersections; for each selected image, identify red, yellow, and green objects within the selected image; identify associated ones of the red, yellow, and green objects within two or more of the selected images, based on the geographic location and orientation information of the two or more selected images; determine the three-dimensional locations of traffic signals based on (1) the identified associations between the two or more of the selected images and (2) the geographic location and orientation information of the two or more selected images; generate a map of the three-dimensional locations of traffic signals; receive a request, from the client device, for a portion of the map, the request identifying a geographic location; identify a relevant portion of the map based on the identified geographic location; and transmit the relevant portion of the map to the client device. The processor of the second device is configured to repeatedly determine the current location of a client device; transmit a request including the current location of the client device; receive the relevant portion of the map; determine an estimated location of the boundaries of a traffic signal based on a comparison of the current location of the client device to received relevant portion of the map; collect images of the estimated location; for each collected image, identify red, yellow, and green objects within the boundaries of the estimated location of the traffic signal; and determine the status of the traffic signal based on the color of the identified object within the boundaries of the estimated location of the traffic signal.

As discussed herein, different features may be used in any combination in any embodiment. For example, each of the plurality of images is collected by one or more cameras, each camera associated with a vehicle.

In another example, the geographic location and orientation information associated with each image of the plurality of images is generated based on the geographic location and orientation of the camera as determined by a geographic position device associated with the associated vehicle.

In another example, the geographic location and orientation information associated with each image are determined by a laser positioning device.

In another example, the geographic location and orientation information associated with each image are determined by a GPS positioning device.

In another example, the geographic location and orientation information associated with each image are determined by an inertial positioning device.

In another example, the geographic location information is GPS latitude and longitude coordinates. In another example, where each of the plurality of images is collected by one or more cameras, each of the one or more cameras is associated with gain and shutter speed which are set to avoid saturation of a traffic signal light.

In another example, where each of the plurality of images is collected by one or more cameras, each image of the plurality of images is uploaded from each of the one or more cameras to the computer via a network.

In another example, where each of the plurality of images is collected by one or more cameras, each of the one or more cameras is positioned to minimally obstruct the view of a driver of the vehicle.

In another example, the red, yellow, and green objects identified by the processor of the computer are the appropriate size and aspect ratios to correspond to traffic signals.

In another example, the identifying associated ones of the red, yellow, and green objects of two or more selected images by the processor of the computer is based on an association distance between identified objects of the two or more selected images.

In another example, the identifying associated ones of the red, yellow, and green objects of two or more selected images by the processor of the computer is based on the physical dimensions of a traffic signal.

In another example, the identifying associated red, yellow, and green objects of two or more selected images by the processor of the computer is based on direct motion compensation between the selected images.

In another example, the processor of the first computer is further configured to identify the identified ones of red, yellow, and green objects within a selected image as an object other than a traffic signal light based on the direct motion compensation.

In another example, the processor of the first computer is further configured to determine a lane associated with the particular traffic signal based on comparing the determined the three-dimensional location of the particular traffic signal to a map of lanes through an intersection.

In another example, the client device includes an electronic display and the processor of the client device is further configured to identify the status of the traffic signal on the electronic display.

In another example, the current location of the client device is determined by a laser positioning device. In another example, the current location of the client device is determined by a GPS positioning device.

In another example, the current location of the client device is determined by an inertial positioning device.

In another example, the collected images are collected by a client camera of the client device.

In another example, the client camera is associated with gain and shutter speed which are set to avoid saturation of a traffic signal light.

In another example, the processor of the client device is further configured to store the received portion of the map in memory of the client device and access the received portion from the memory.

In another example, the red, yellow, and green objects identified by the processor of the client device are the appropriate size and aspect ratios to correspond to traffic signals.

In another example, determining the status of the traffic signal is based on the location of the identified object within the boundaries of the estimated location.

In another example, the boundaries of the estimated location are associated with dimensions, and the dimensions are greater than the dimensions of the traffic signal.

In another example, the client device is further configured to determine a traffic lane associated with the client device based on comparing the current location of the client device to a map of traffic lanes through an intersection.

In one alternative, the processor of the client device is further configured to determine an estimated location of the boundaries of the traffic signal is based on the traffic lane associated with the client device.

In another example, the processor of the client device is further configured to determine whether the status of the traffic signal has changed from a default status.

In another example, the processor of the client device is further configured to determine that the status of the traffic signal is the default status if there are no identified objects within the boundaries of the estimated location of the traffic signal. In one alternative, the default status is a yellow light. In another alternative, the default status is a red light.

In another example, the client device is further configured to transmit the status of the traffic signal to a computer associated with a vehicle.

In another example, the processor of the client device is further configured to transmit an instruction to decelerate the vehicle if the status of the light is red or yellow.

In another example, the client device includes one or more speakers and the processor of the client device is further configured to identify the status of the traffic signal audibly.

In another example, the processor of the client device is further configured to provide driving instructions based on the status of the traffic signal.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Cameras with fixed exposure and aperture may be directly calibrated to collect images of traffic light color levels. The position, location, and orientation of a traffic light may be automatically extrapolated from two or more of such images. This information may then be used to generate maps which identify the 3D location of traffic lights. These 3D maps of traffic signals may allow a client device to anticipate and predict traffic lights.

Figure 1A:
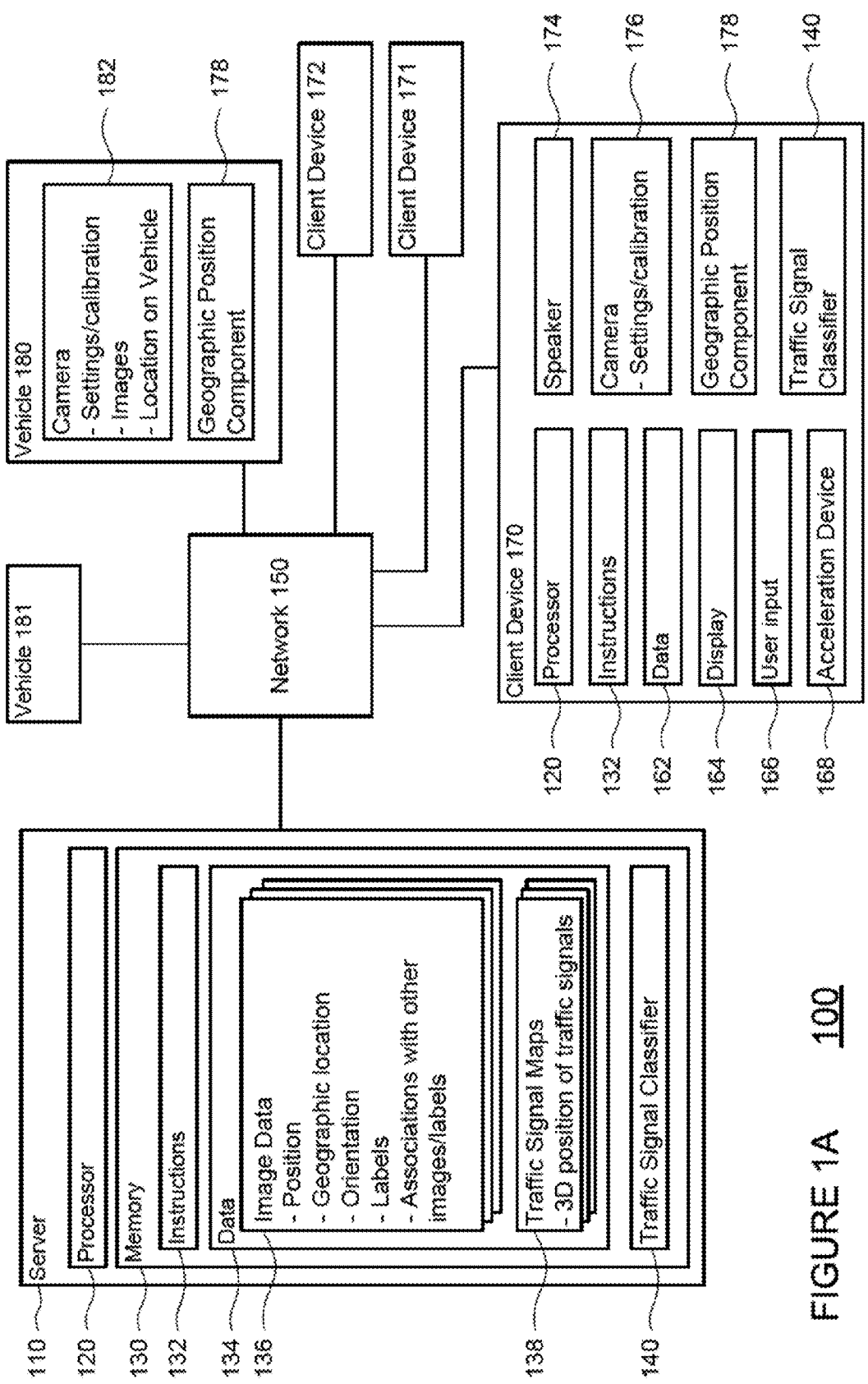
FIG. 1A is a functional diagram of a system in accordance with an aspect of the invention.
Figure 1B:
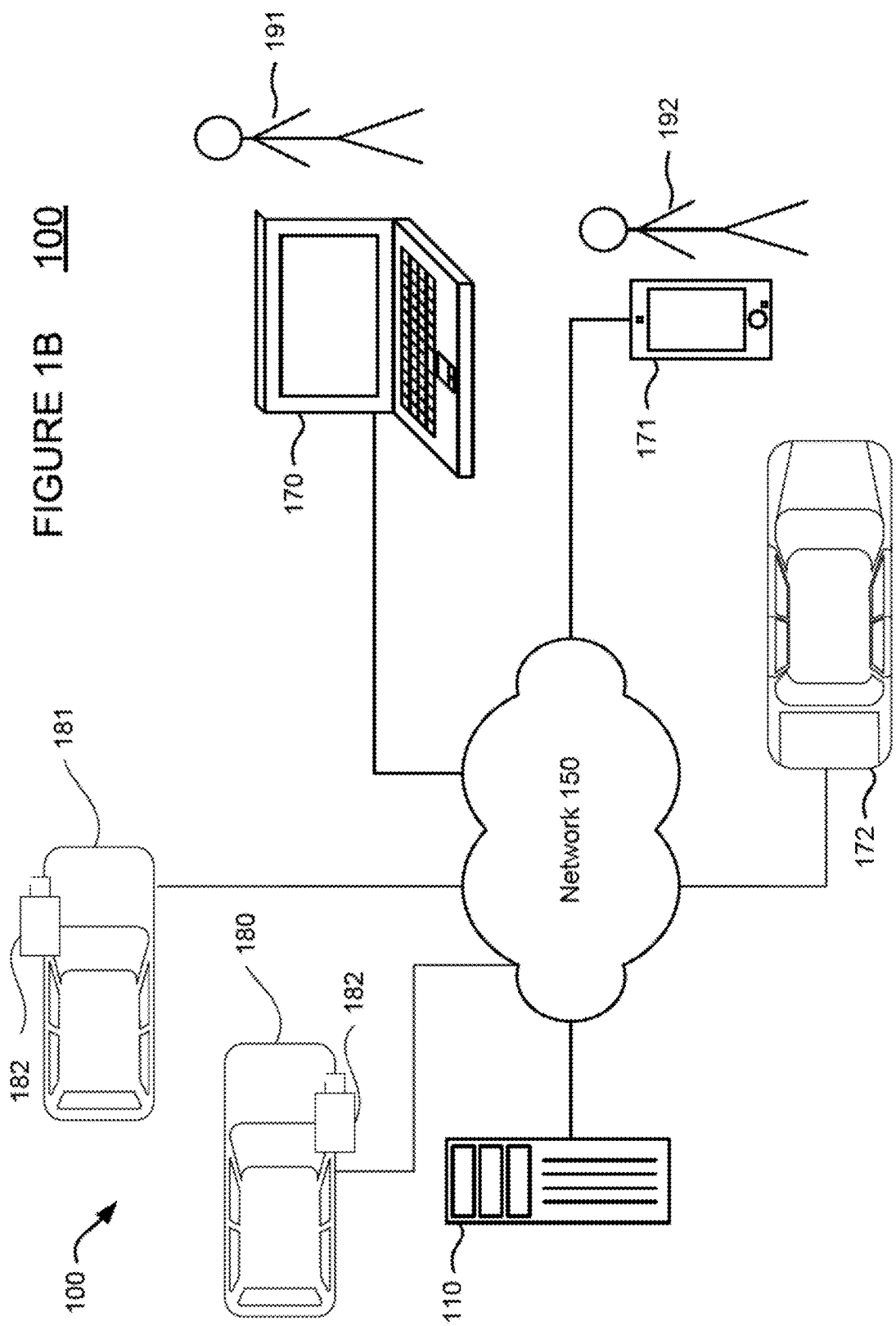
FIG. 1B is a pictorial diagram of a system in accordance with an aspect of the invention.

As shown in FIGS. 1A and 1B, a system 100 in accordance with one aspect of the invention includes a computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory vehicled, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may comprise a web server that is capable of communicating with client devices 170-72 via network 150 such that server 110 uses network 150 to transmit and display or otherwise provide information to a user, such as person 191 or 192 in FIG. 1B. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Figure 2:
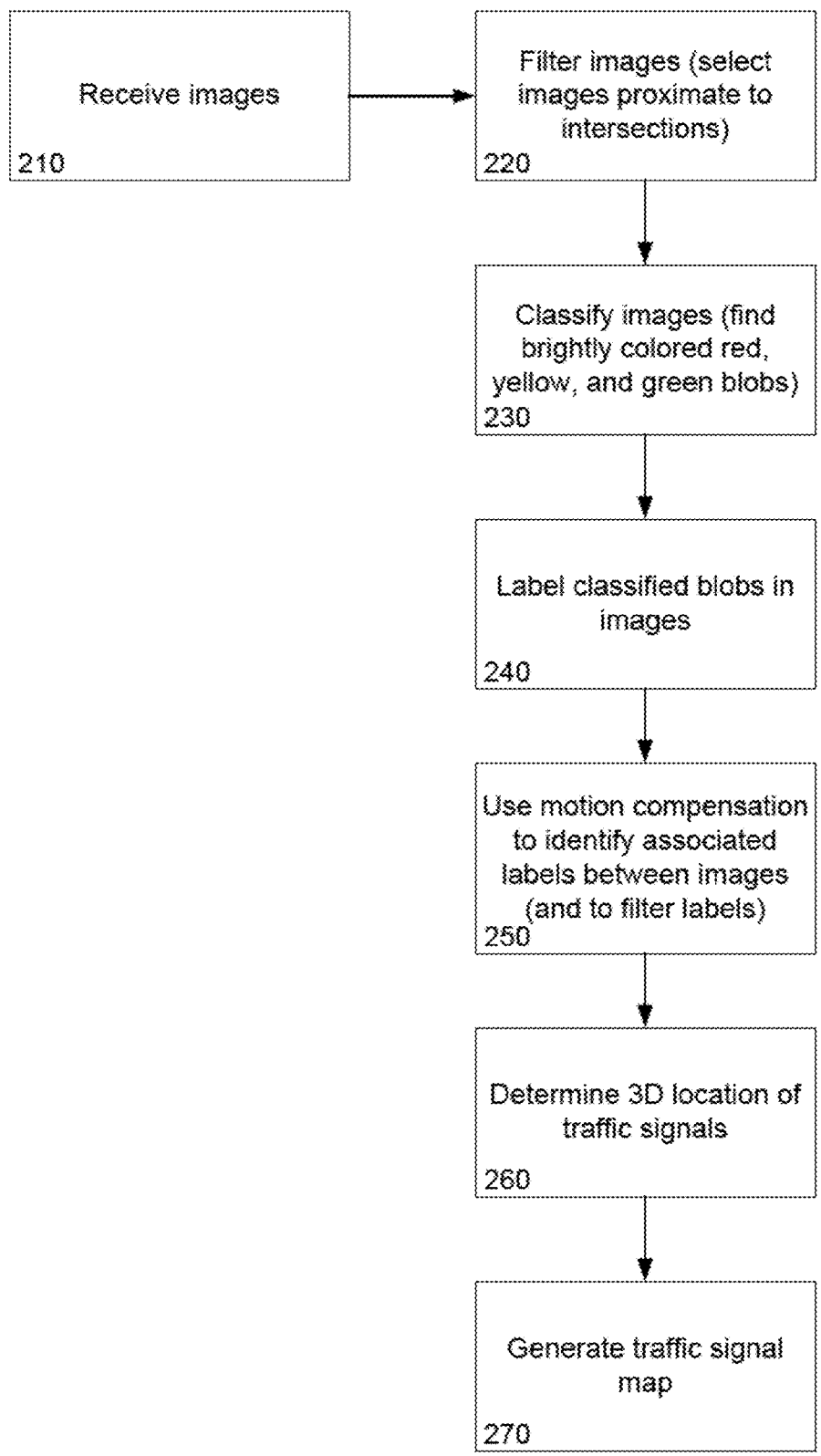
FIG. 2 is an exemplary image of traffic signals and lights in accordance with an aspect of the invention.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor 120, memory and instructions 132. Each client device 170-72 may be a device intended for use by a person 191-192, and have all of the components normally used in connection with a computer such as a central processing unit (CPU), memory (e.g., RAM and internal hard drives) storing data 162 and instructions such as a web browser, an electronic display 164 (e.g., a monitor having a screen, a small LCD touch-screen, a projector, a television, a computer printer or any other electrical device that is operable to display information), and user input 166 (e.g., a mouse, keyboard, touch-screen and/or microphone). The client device may also include a camera 176, geographic position component 168, one or more speakers 174, a network interface device, as well as all of the components used for connecting these elements to one another.

Although the client devices 170-72 may each comprise a full-sized personal computer, they may alternatively comprise mobile devices which may or may not be capable of wirelessly exchanging data with a server over a network such as the Internet. By way of example only, client device 172 may be a vehicle-mounted device or connected to a vehicle such that client device 172 may exchange information with the vehicle's computer. In another example, client device 171 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, client devices in accordance with the systems and methods described herein may comprise any device capable of processing instructions and transmitting data to and from humans and other computers including general purpose devices, network computers lacking local storage capability, etc.

The client devices may also include a geographic position component to determine the geographic location and orientation of the device. For example, client device 170 may include a GPS receiver to determine the device's latitude, longitude and/or altitude position. Other location systems such as laser-based localization systems, inertial-aided GPS, or camera-based localization may also be used. In addition, the geographic position component may also comprise software for determining the position of the device based on other signals received at the client device 171, such as signals received at a cell phone's antenna from one or more cellular towers if the client device is a cell phone.

Client device 171 may also include other features, such as an accelerometer, gyroscope or other acceleration device 168 to determine the direction in which the device is oriented. By way of example only, the acceleration device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

Returning to FIG. 1A, data 134 may include image data such as images of traffic signals. The images may be associated with various information including the position, location, and orientation of the vehicle or camera at the time the image was taken. The image data may also be associated with labels indicating the position and location of a traffic signal in the image. These labels may be generated by various methods. For example, one method for generating labeled images is to use a team of human labelers. However, human labelers may be relatively slow when required to work on the high density of lights in a typical urban environment. Furthermore, even the best human labelers are not always accurate in their placement of labels. In another example described in more detail below, the labels may be generated automatically by using traffic signal classifier 140.

Image data 134 may also include associations with other images. For example, where two labels in two different images identify the same traffic signal, these labels (or images) may be associated with one another. As will be described in more detail below, these labels and associations between images may be used to generate traffic signal maps 138 which identify estimated 3D positions of traffic signals.

These images may be collected, for example, by manually driving a vehicle instrumented with cameras and navigation systems such as GPS, inertial, and/or laser systems through intersections and collect precisely time stamped laser ranges and camera images. Vehicles, such as vehicles 180-81, may use various types of cameras 182 mounted in various configuration to collect traffic light images. For example, a Point Grey Grasshopper 5 MP camera may be positioned to face straight ahead and mounted to the right of rear-view mirror, where it minimally obstructs the driver's field of view. A specific region-of-interest may be selected for the camera, such as a 2040×1080 region, of a camera with a fixed lens with a 30 degree field of view. For example, the camera may be calibrated to be able to detect traffic signals at 150 m when traveling at 55 MPH to ensure a reasonable breaking distance.

Vehicles 180-181 or camera 182 may also include a geographic position 178 component described above. The geographic position component may be used to identify the geographic location, orientation, and position of the camera or vehicle when a particular image was taken.

Vehicles 180-81 may record images for use by server 110. The images and associated information may be uploaded to server 110 via network 150 from the vehicle or loaded to server 110 directly.

In order to collect the images of light traffic signals at night, the gain and shutter speeds may be set to avoid saturation of the traffic lights, particularly the bright LED-based green lights. These settings may be used to yield a relatively dark image even during the day.

FIG. 2 depicts an embodiment 200 which will be described in detail below. It will be understood that the operations do not have to be performed in the precise order described below. Rather, various steps can be handled in a different order or simultaneously.

As shown in block 210 of FIG. 2, image data is received by server 110. Then, at block 220, the server filters down the images to the most relevant ones, i.e., images likely to contain traffic lights. Generally, traffic signals will be positioned at intersections, so geo-spatial queries may be used to discard images taken when no intersections are likely to be visible.

After winnowing the set of images to those that were taken while the vehicle was approaching an intersection, the images are classified and labeled, as shown in blocks 230 and 240. Server 110 may use a traffic signal classifier which finds brightly-colored red, yellow, and green blobs with appropriate size and aspect ratios, and these blobs are then used as tentative traffic signal labels for the position estimation process. Although the present invention is described in conjunction with typical vertical traffic signals having a set of red, yellow, and green lights, it will be understood that this specific structure is used merely as an example. Traffic signals may have varied and sometimes complex geometries and the invention may operate with any number of these additional geometries.

Figure 3:
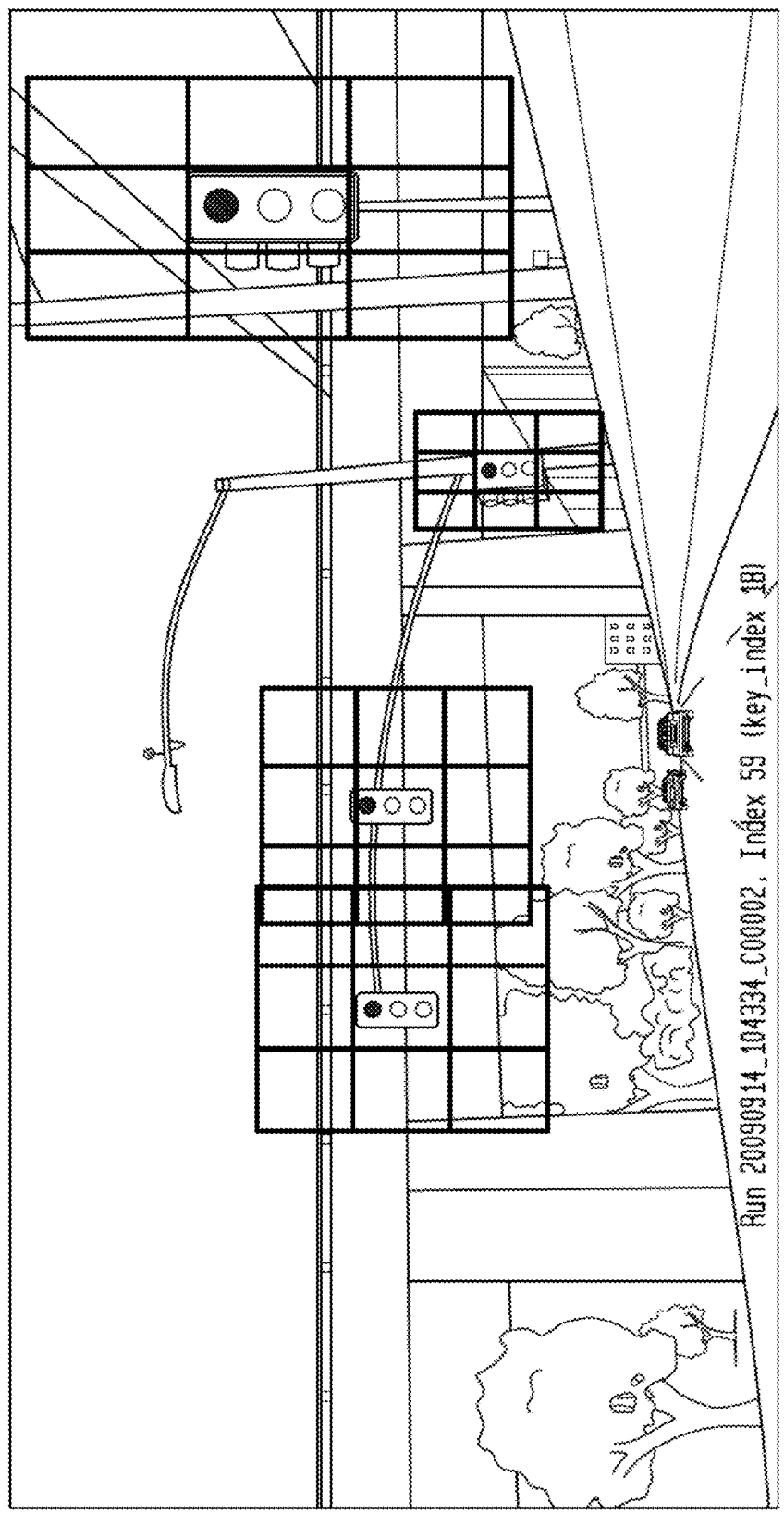
FIG. 3 is a flow diagram in accordance with an aspect of the invention.

FIG. 3 depicts human labeled examples of traffic signals. For each positive example, eight additional negative examples may be generated. If the newly generated examples overlap with a positive example, for example, where two traffic signals are very close together, the newly generated examples may be discarded.

The output of the labeling step my be a large number of labels, but with no information about which labels belong to which traffic signals. To estimate the position of an object in 3D requires at least two labels in different images, and the position estimate will generally improve if more labels are available. However, in order to identify two or more images which include the same subject matter, such as a particular traffic signal, the labels of the images must be associated with one another. Two images may be associated if the labels associated with those images fall within an association distance of one another. For example, each label may have a diameter d. If the centers of two labels are within a relatively small distance of one another, such as d or 10d, these labels may be associated with one another. In another example, if two labels overlap, the labels may be associated. Associations may be determined between labels in image sequences, between 3D objects once position estimation has been performed, or by using an iterative approach that combines both types of associations.

In order to identify the associations, the server may make some inferences about the types of traffic signals pictured. For example, the full size of the traffic signal may be inferred by assuming that the signal has the standard vertical red-yellow-green structure, which is by far the most common configuration. These full-sized traffic signal labels may make associating labels that come from traffic signals that have changed color simpler.

Label association between images may be performed in various ways. For example, in the case of near-affine motion and/or high frame rates, template trackers can be used to associate a label in one image with a label in the next image. In another example, where the camera frame rate is low, such as fps, and the object motion may be fully projective, direct motion compensation may be used.

As noted above, the precise camera pose, or position/location/orientation, is known for each image. If the camera is mounted on a moving vehicle, the cumulative error in the pose may be relatively low, for example 1% of distance traveled, over time periods of several seconds. In some examples, position estimates of the vehicle may be refined by offline optimization methods to yield position accuracy within 0.15 m.

Returning to block 250 of FIG. 2, server 110 may use direct motion compensation to identify associations between labels in different images. The apparent motion of objects due to changes in roll, pitch, and yaw may be straightforward to correct using the intrinsic camera model, but some estimate of the object's position may be necessary to correct the apparent motion of objects due to the vehicle's forward motion. The object's apparent position in the image restricts its position to somewhere along a ray, and a rough estimate of the distance of the object can be made by assuming that the object is a traffic signal of particular dimension. The distance d to an object with true width w and apparent width w in an image taken by a camera with focal length $f_u$ is:

$$d \approx \frac{\tilde{w}}{2\tan\left(\frac{\tilde{w}}{2fu}\right)}$$

The direction vector $X=[u,v]^T$ may be computed by using the camera model to correct for radial distortion, and the rough 3D position of the object is:

$$y = \sin(\arctan(-u))d,$$

$$z = \sin(\arctan(-v))d,$$

$$x = \sqrt{d^2 - y^2 - z^2}.$$

If T1 and T2 are the 4×4 transformation matrices for two different times from the vehicle's frame to a locally smooth coordinate frame and C is the transform from the vehicle frame to the camera frame the relative motion of the object from one image to another may be corrected as:

$$\hat{x}_2 = CT_2T_1^{-1}C^{-1}x_1$$

The distorted image coordinates may be computed by using the camera's intrinsic model. As noted above, two labels (of traffic signals in two images) may be associated if the labels fall within an association distance of one another. Thus, long sequences of labels may be associated indicating that they all are associated with images of a particular traffic signal.

In some instances, a label may correspond to other types of objects, for example, tail lights of another vehicle. In these cases, the rough distance estimate and the subsequent motion compensation will be incorrect, and the likelihood of label associations between objects incorrectly classified as traffic signals may be reduced. This may also allow the server to filter out spurious labels.

If the motion-corrected label overlaps another label, it is likely that these labels correspond to the same object. The 3D position of the object may be estimated from a sequence of the corresponding labels.

As shown in block 260, server 110 may use the associations to determine the 3D location of the traffic signals. Specifically, the pose of the 3D object may be estimated based on the associated labels in two or more images. For example, the optimal triangulation method may be used, however, this method may be used with at most three labels and may be less useful when there are many labels for the same traffic signal. In another example, the pose may be estimated by using linear triangulation and the Direct Linear Transform, a least-squares method.

Using the least squares method, each provisionally classified image label may be associated with the image coordinate $\bar{x}$. These image coordinates may be converted into a direction vector x using the camera's intrinsic model to correct for radial distortion, etc.

The 3D point X may be estimated such that for each label direction vector $x_i$ and the camera projection matrix $P_i$, $$x_i = P_i X$$

These equations may be combined into the form:

$$AX = 0$$

which is a linear equation in X. To eliminate the homogeneous scale factor inherent in projective geometry, a 3n×4 matrix A may be assembled from the cross product of each of the image labels $\{x_1, x_2, \ldots\}$ for a particular object:

$$A = \begin{bmatrix} [x_1] \times HP_1 \\ [x_2] \times HP_2 \\ \ldots \end{bmatrix}$$

where the cross-product matrix is:

$$[x]_\times = \begin{bmatrix} 0 & -1 & -u \\ 1 & 0 & -v \\ u & v & 0 \end{bmatrix}$$

and $$H = \begin{bmatrix} 1 & 0 & 0 & 0 \\ 0 & 1 & 0 & 0 \\ 0 & 0 & 1 & 0 \end{bmatrix}$$

Performing singular value decomposition on A, where $A = U\Sigma V^T$, the solution for X is the de-homogenized singular vector that corresponds to the smallest singular value of A, or the right most value of A.

The orientation of the signal may be estimated as the reciprocal heading of the mean vehicle heading over all the images labels used to estimate the traffic signal position.

The information generated above may be used to generate map information which describes the 3D location and geometries of traffic signals, as shown in block 270. The accuracy of the map information may be sensitive to the extrinsic parameters of the camera, i.e., the transform that represents the camera's position and orientation relative to the vehicle's coordinate frame. Assuming a reasonable initial estimate of the extrinsic parameters, these parameters may be calibrated by minimizing the reprojection effort of the traffic signals using coordinate descent:

$$e^* = \arg\min_e \sum_i (RadialLensDistortion(PX_{i,e}) - x_i)^2$$

Here, $X_e$ are the traffic signal positions estimated by the mapping pipeline using extrinsic parameters e. A similar process may be used to estimate the timing delay between when the image is taken by the camera and when it is transmitted to the computer (although hardware timestamps may also be used). This timing delay may vary depending on the camera frame rate and Firewire bus scheduling allocation, but it also may be stable to within a few hundredths of a second for a given configuration. The camera's intrinsic parameters, which determine the lens distortion, may be calibrated for a standard radial lens model using the checkerboard corner extraction procedure.

Traffic signals may also be identified to the actual lane to which they apply. For example, some traffic signals may apply only to left or right turn only lanes. This information may be represented as an association between a traffic signal and the different allowed routes through an intersection. Simple heuristics based on the estimated traffic signal orientation and the average intersection width may be used to make an estimate as to these associations. These estimates may then be manually verified. This is particularly necessary for complex multi-lane intersections.

New labels may be continuously added and used to optimize the classifier. Various optimization methods may be used, including grid search and hill climbing. For example, in a grid search, each axis of the parameter space may be discretized, and all combinations of these discretized coordinates are evaluated. A coarse grid may provide insight into the structure of the space to be optimized.

Although the steps of FIG. 2 are described as proceeding by use of a single central server computer, images may be distributed across a set of computers such that each computer loads a small set of images into RAM and then repeatedly evaluates the classifier according to the current optimizer state on those cached images. A particular classifier configuration may be evaluated over a set, for example of 10,000 images, by a few hundred computers in under a second. This allows for the use of iterative hill-climbing approaches, such as coordinate ascent, to optimize the classifier in within a short period of time. Further parallelization may be possible by batching up all the states to be evaluated in a single optimizer step. If there are far more of the automatically generated negative examples, the outcome of the positive examples may be weighed 10× higher.

Figure 4:
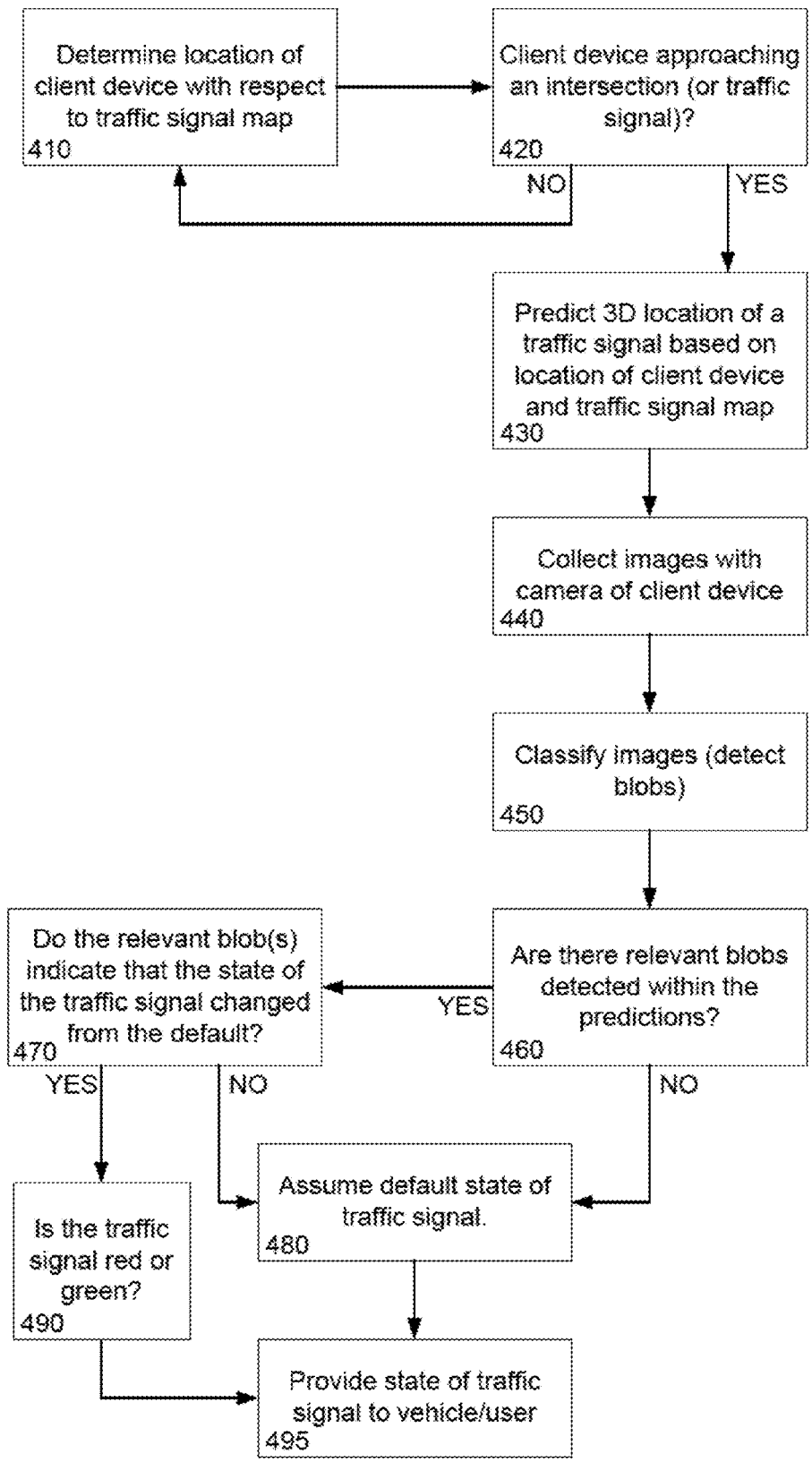
FIG. 4 is a flow diagram in accordance with an aspect of the invention.

Once the map information has been generated, the information may be used to assist robotic vehicles or drivers. The traffic signal map may be used to identify and interpret traffic signals (red, yellow, or green). FIG. 4 depicts an exemplary flow diagram 400 of this process. As shown in block 410, the client device continuously determines the location of the client device with respect to a relevant portion of the traffic signal map. For example, a vehicle-mounted or portable device may have direct access to the traffic signal map or may request or automatically receive portions of the map from the server based on the location of the device (or vehicle).

The client device then determines whether it is moving towards an intersection (or traffic signal), as shown in block 420. If the client device is approaching an intersection, the client device may predict the 3D location of traffic signals at the intersection based on the location of the client device and the traffic signal map, as shown in block 430.

Using the vehicle pose and the traffic signal map, predictions may be made about when traffic lights should be visible and where they should appear in the image frame. The position of the vehicle or device with respect to the traffic light map may be estimated from one or more of GPS, laser-based localization systems, inertial-aided GPS, camera-based localization, or a lidar localization system which also identifies elevation. A kd tree or S2 spherical geometry cells and a simple visibility model that includes the vehicle orientation as well as the traffic signal orientation may be used to predict the position of nearby lights. The predicted positions may then be projected using the camera model into the image frame as an axis-aligned bounding box. The geometry of the bounding box may be determined based on the geometry of the traffic signal as described by the map information. To account for inaccuracy in the prediction, in one example, the bounding box may be made three times larger in each axis than the actual prediction.

The client device may use a camera to collect images and uses a classifier to detect the red, yellow, or green blobs of these images at blocks 440 and 450.

The client device may use the classifier described above to find appropriately-sized brightly colored red, yellow, and green blobs within each of the predicted bounding boxes. The geometry of the traffic lights may be used to distinguish between different types of lights. For example, if a particular traffic signal has a green light, the approximate location, shape, and design of the traffic signal may be used to determine if the green light refers to a left arrow or a round light. The result is a set of possible classifications for each traffic signal which can be used to identify the state of the traffic signal.

If there are no relevant blobs detected within the predicted locations at block 460, the client device may assume some default state of the traffic signal at block 480. The client device may assume a default state such as a yellow light. Selecting yellow as a default may act as a safety mechanism as it indicates the need for the vehicle to slow down. It may be assumed that it is almost always safe to allow the vehicle to slow down when approaching an intersection in order to continue to classify the state of the traffic signal. If there is no new classification, the client device may determine that the state of the traffic signal has not changed and that the light is still yellow.

In addition, the client device may also select the geometrically highest classification within a predicted bounding box. For example, within a window. For example, a given bounding box, there may be several lights detected. The client device may determine that the highest physical light is corresponds to the traffic signal. This may prevent the misclassifying of objects such as orange pedestrian cross-walk lights that are frequently just below green lights, but well within the predicted bounding box (see the "Don't Walk" sign 550 of FIG. 5).

Returning to FIG. 4 at block 470, if there are relevant blobs detected by the classifier, the client device will determine whether there has some been some state change to the traffic signal. If there is no state change, the client device may again assume the default state of the traffic signal at block 480. If there is some state change, the client device may determine the type of change at block 490. Finally, the state of the traffic signal has been determined and is ready to be used to assist the vehicle or user at block 495.

The state and position of the traffic signal may then be used to assist a driver or robotic car. Where the device is used within a vehicle which is driven by a person, the device may provide information regarding the state of the traffic signal. For example, the device may provide visual or audible indications that the light is red, yellow or green, such as "the light is yellow." In another example, the device may provide audible instructions or warnings, such as "apply the brakes, the light is red" or "the light is red, stop the vehicle." In another example, the device may indicate that the correct light, such as a left turn signal, is not green. The device may be used to send instructions to the vehicle that the brakes should be applied. If the device is used in conjunction with a navigation system, additional directions, such as "stop at the next intersection, the light is red" may be included.

Figure 5:
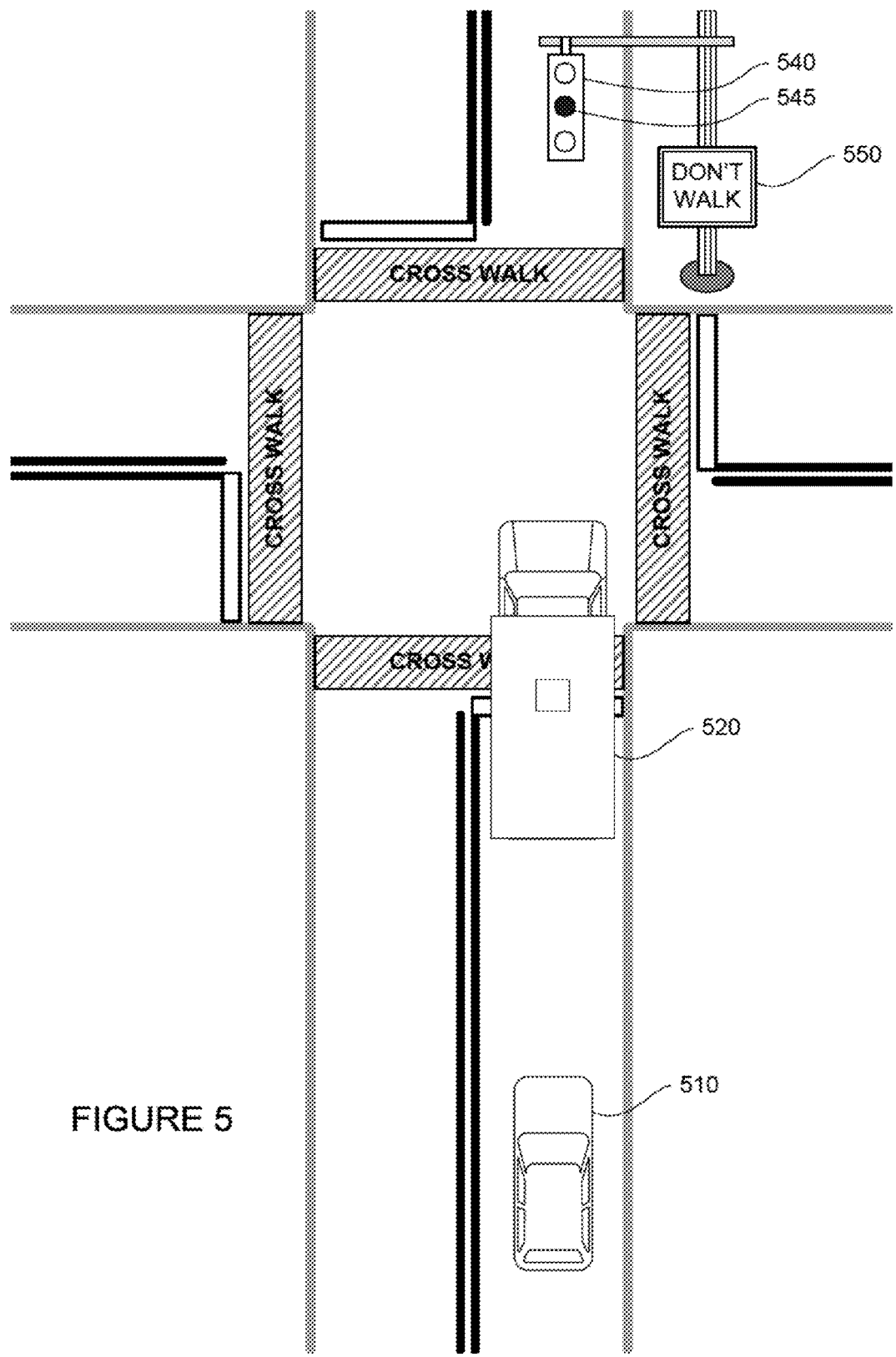
FIG. 5 is a diagram of a traffic intersection in accordance with an aspect of the invention.

In the example of FIG. 5, the driver of vehicle 510 is approaching an intersection. The driver's view of traffic signal 540 may be limited or completely blocked by vehicle 520. The client device within vehicle 510 may determine that the traffic signal is visible in the images taken by the camera and may determine, for example, that traffic signal light 545, a yellow light, is illuminated. The client device may pass this information to the driver by, for example, using a visual or audible signal, stating "slow down, the light is yellow," or indicating to the vehicle's computer the need to apply the brakes. If the client device is unable to discern the status of the traffic signal, the device may use the default and again provide some visual or audible instruction to the user. In another example, a vehicle may be stopped for red light of a traffic signal. When the light changes to green, the client device may identify the change in the state of the traffic signal and provide this information to the driver or the vehicle's computer. After receiving the information, the driver or computer may, for example, begin to accelerate the vehicle.

In a further example, the vehicle may be traveling on a particular route and the client device may use its position to determine the lane of travel through an intersection. Based on this information, the client device may determine which traffic signals associated with the intersection are relevant to the intended route and update the vehicle's computer or the user on the status of the relevant traffic signals.

When a vehicle is operating autonomously, the device may decide a particular path through an intersection by determining that within a predicted bounding box, no red or yellow lights are detected, and at least one green light must be detected. It will be appreciated that while there are generally multiple semantically identical lights in an intersection, it may only be necessary for the device to identify one of these lights to determine whether to pass through.

Figure 6:
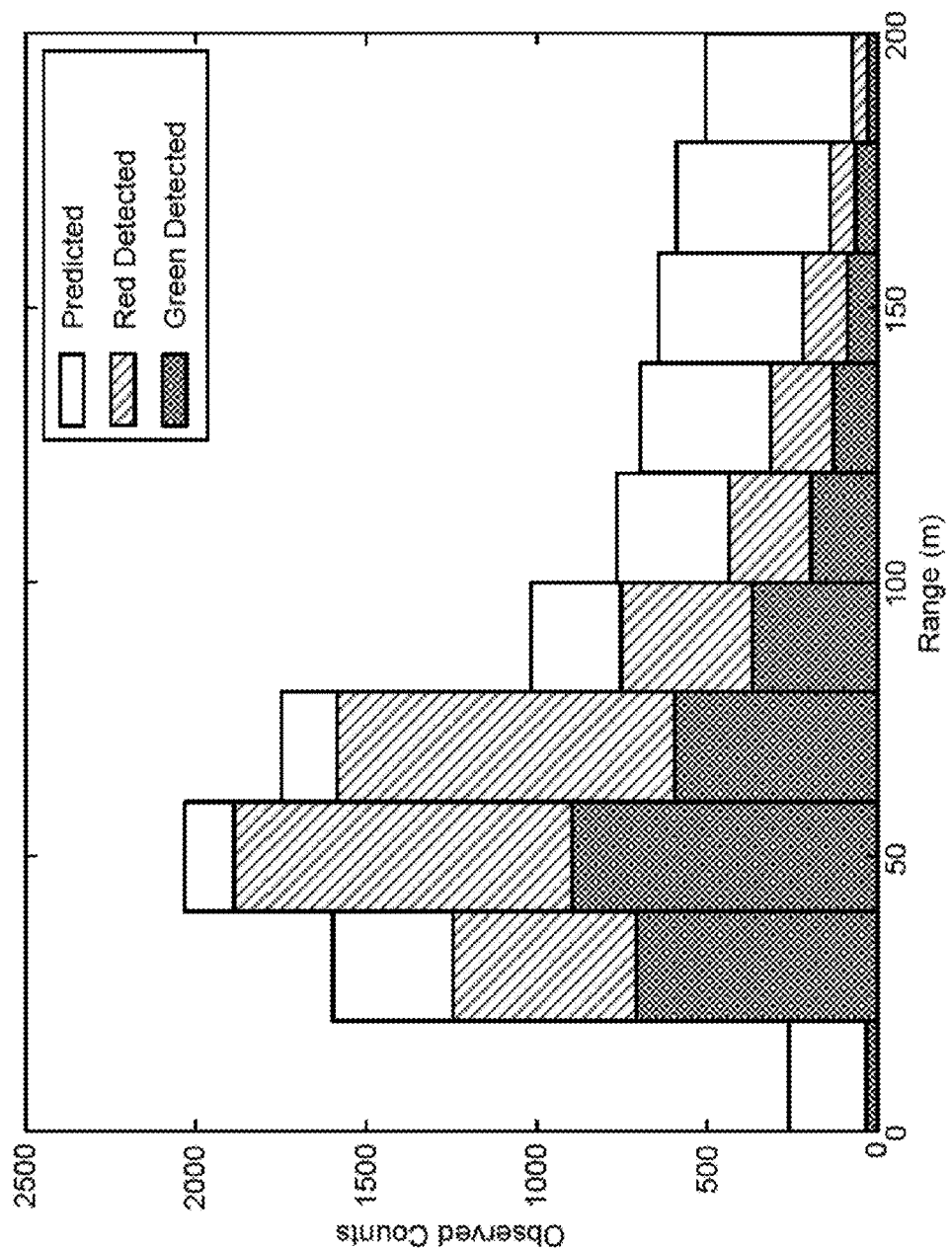
FIG. 6 is an exemplary histogram of experimental data in accordance with an aspect of the invention.

FIG. 6 is a distance histogram of predicted and detected lights during an experimental 32 km drive along urban streets and highways during which the device was used to control the car's passage through intersections. In this example, traffic signals were detected out to 200 m, which was when the device begins to predict that the traffic signals should be should be visible. The traffic signals are thus predicted even where there are obstructions between the device in the vehicle and the traffic signals (see FIG. 5 and associated description above).

Figure 7:
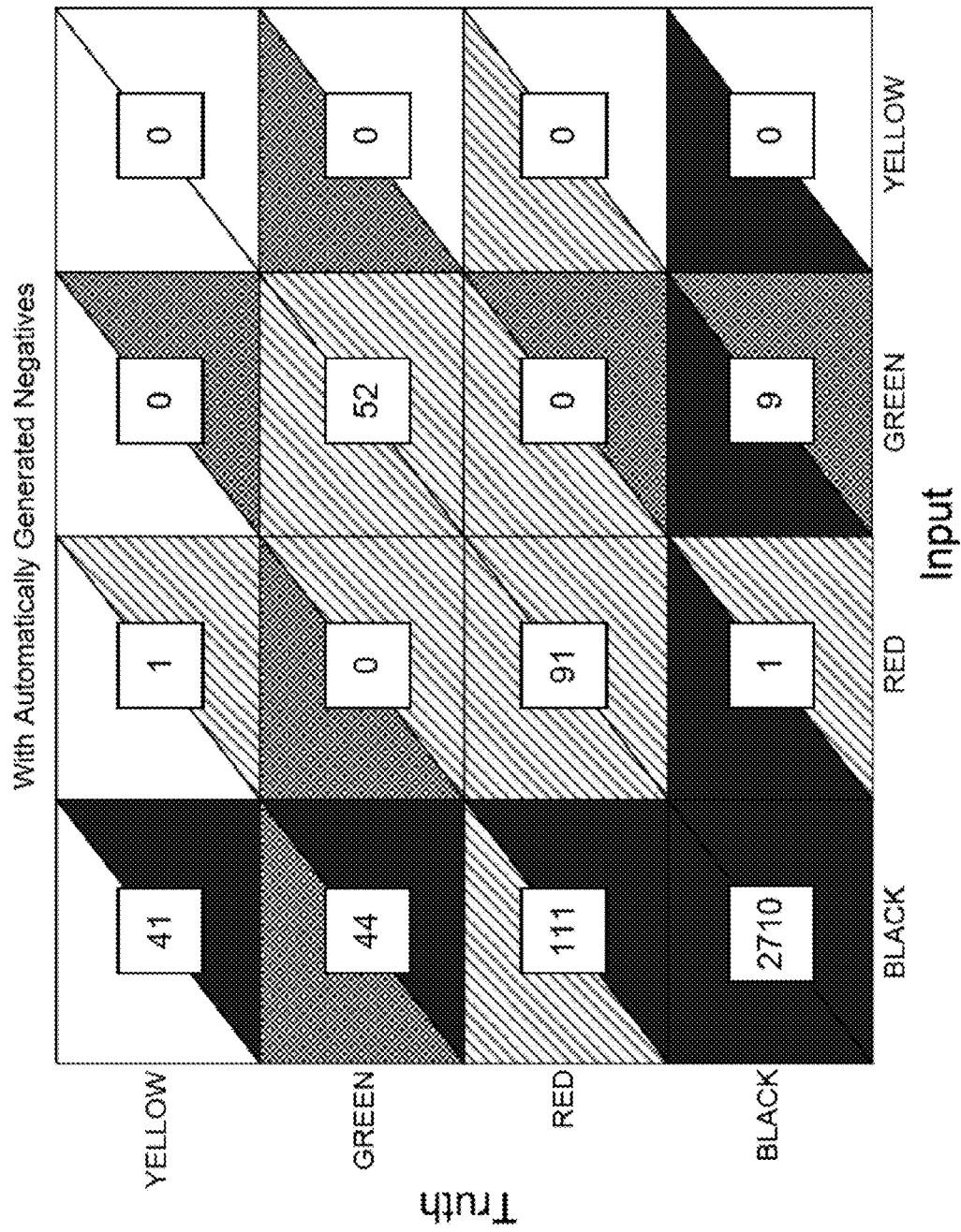
FIG. 7 is an exemplary confusion matrix of experimental data in accordance with an aspect of the invention.

FIG. 7 depicts the traffic signal confusion matrix for the experimental driving session. The matrix includes negative examples generated from the eight neighbors of each positive example. Yellow signal examples were not included in the ground truth.

Table 1 below contains true positives (tp), true negatives (tn), false positives (fp), and false negatives (fn) from the traffic signal confusion matrix.

TABLE 1

|  | Detector Positive | Detector Negative |
|---|---|---|
| Positive | 856 (tp) | 527 (fn) |
| Negative | 3 (fp) | 6938 (tn) |

Base on Table 1, the experimental device's the precision was 99% (851/859=0.99), while the recall was 62% (851/1387=0.62). A latency of approximately 0.2 s was experienced primarily due to the latency for the transmission of the image to the experimental device of approximately 0.12 s. Based on camera bandwidth limitations, the frame rate of the detection pipeline was 4 Hs. The processor load was less than 25% of a single CPU (central processing unit), primarily due to the high resolution of the images. The experimental device worked best at night and with moderate rain where the camera was mounted behind an area swept by windshield wipers.

Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

It will be further understood that the sample values, types and configurations of data described and shown in the figures are for the purposes of illustration only. In that regard, systems and methods in accordance with aspects of the invention may include different physical attributes, data values, data types and configurations, and may be provided and received at different times and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any technology for determining the geographic location and orientation associated with a camera or particular image may be employed in any configuration herein. Each way of communicating or identifying the location of a traffic signal or the status of the traffic signal may be used in any configuration herein.

The invention claimed is:

1. A method comprising:
 receiving, by one or more processors of a vehicle, an image of a traffic intersection captured using a camera of the vehicle as the vehicle approaches the intersection, the image being associated with location information;
 identifying, by one or more processors of the vehicle, a set of red, yellow, and green objects within the image;
 generating, by the one or more processors of the vehicle, a set of traffic signal labels based on the set of identified red, yellow and green objects;
 filtering, by the one or more processors of the vehicle, the set of traffic signal labels to remove labels for red, yellow, or green objects that correspond to objects other than a traffic signal light; and
 determining, by the one or more processors of the vehicle, a three-dimensional location of a traffic signal based on the filtered set of traffic signal labels and location information of the image; and
 determining, by the one or more processors of the vehicle, a status of the traffic signal based on the three-dimensional location and the image.

2. The method of claim 1, further comprising capturing the image using the camera.

3. The method of claim 2, further comprising accessing a detailed map in order to identify the intersection before capturing the image.

4. The method of claim 1, further comprising, maneuvering, by the one or more processors of the vehicle, the vehicle through the intersection in an autonomous driving mode based on the status.

5. The method of claim 4, further comprising announcing the status audibly to a driver of the vehicle.

6. The method of claim 4, further comprising:
incorporating the status into a navigation direction; and
providing the navigation direction to a driver of the vehicle.

7. The method of claim 1, further comprising identifying associated labels within two or more images captured using the camera of the vehicle as the vehicle approaches the intersection, based on the geographic locations of the two or more images.

8. The method of claim 7, wherein determining the three-dimensional location of the traffic signal is further based on the identified associated labels.

9. The method of claim 1, further comprising when the one or more processors of the vehicle are unable to discern the status, using a default value to provide a notification of the status of the traffic signal to the driver of the vehicle.

10. The method of claim 1, further comprising when the one or more processors of the vehicle are unable to discern the status, using a default value to provide a notification of the status of the traffic signal to the driver of the vehicle.

11. The method of claim 1, further comprising when the one or more processors of the vehicle are unable to discern the status, using a default value to provide a notification of the status of the traffic signal to the driver of the vehicle.

12. A system comprising:
a camera configured to capture an image of a traffic intersection as the vehicle approaches the intersection;
one or more processors configured to:
receive location information for the image;
identify a set of red, yellow, and green objects within the image;
generate a set of traffic signal labels based on the set of identified red, yellow and green objects;
filter the set of traffic signal labels to remove labels for red, yellow, or green objects that correspond to objects other than a traffic signal light; and
determine a three-dimensional location of a traffic signal based on the filtered set of traffic signal labels and location information of the image; and
determine a status of the traffic signal based on the three-dimensional location and the image.

13. The system of claim 12, further comprising memory storing a detailed map, and wherein the one or more processors are further configured to access the detailed map in order to identify the intersection before the image is captured.

14. The system of claim 12, wherein the one or more processors are further configured to maneuver the vehicle through the intersection in an autonomous driving mode based on the status.

15. The system of claim 12, further comprising a speaker configured to announce the status audibly to a driver of the vehicle.

16. The system of claim 12, wherein the one or more processors are further configured to:
incorporate the status into a navigation direction; and
provide the navigation direction to a driver of the vehicle.

17. The system of claim 12, wherein the one or more processors are further configured to identify associated labels within two or more images captured using the camera of the vehicle as the vehicle approaches the intersection, based on the geographic locations of the two or more images.

18. The system of claim 9, wherein the one or more processors are further configured to determine the three-dimensional location of the traffic signal further based on the identified associated labels.

19. The system of claim 9, wherein the one or more processors are further configured to when the one or more processors of the vehicle are unable to discern the status, use a default value to provide a notification of the status of the traffic signal to the driver of the vehicle.

20. The system of claim 12, further comprising the vehicle.

* * * * *